United States Patent [19]
Kondoh et al.

[11] Patent Number: 5,643,080
[45] Date of Patent: Jul. 1, 1997

[54] AIR OUTLET MEMBER

[75] Inventors: Yoshiyuki Kondoh, Tsuchiura; Tsuyoshi Sakyo, Shimoinayoshi; Yoshimi Iwase, Mitsukaido; Sadahisa Tomita, Mito; Kazunori Komatsu, Ami-machi; Kazuhisa Tamura, Ishioka, all of Japan

[73] Assignee: Hitachi Construction Machinery Co., Ltd., Japan

[21] Appl. No.: 574,918

[22] Filed: Dec. 19, 1995

[30] Foreign Application Priority Data

Dec. 28, 1994 [JP] Japan .................................. 6-327284

[51] Int. Cl.⁶ .................................................. B60H 1/34
[52] U.S. Cl. ............................ 454/155; 454/124; 454/154
[58] Field of Search .............................. 454/108, 109, 454/124, 152, 154, 155, 306, 316

[56] References Cited

U.S. PATENT DOCUMENTS

| | | | |
|---|---|---|---|
| 2,314,850 | 3/1943 | Woelfel | 454/109 |
| 3,018,711 | 1/1962 | Welch et al. | 445/154 |
| 3,264,971 | 8/1966 | Dangauthier | 454/154 |
| 4,135,440 | 1/1979 | Schmidt et al. | 454/286 X |
| 4,633,770 | 1/1987 | Taylor et al. | 454/316 X |

FOREIGN PATENT DOCUMENTS

| | | |
|---|---|---|
| 61-246539 | 11/1986 | Japan . |
| 2-195149 | 8/1990 | Japan . |
| 4-324047 | 11/1992 | Japan . |
| 5-99479 | 4/1993 | Japan . |

*Primary Examiner*—Harold Joyce
*Attorney, Agent, or Firm*—Evenson, McKeown, Edwards & Lenahan P.L.L.C.

[57] ABSTRACT

An air conditioner duct being suitable for connection with an air conditioner arranged in a cab. The air conditioner duct is provided with an air outlet member, which includes an air release portion for releasing air into the cab and plural fins for guiding air to the air release portion. The air outlet member comprises a turnable air outlet member shaped to enclose a duct portion, to which the turnable air outlet member is connected, and is turnable relative to the duct portion.

19 Claims, 7 Drawing Sheets

FIG. 11

AIR OUTLET MEMBER

BACKGROUND OF THE INVENTION a) Field of the Invention

This invention relates to an air conditioner duct suitable for connection with an air conditioner arranged in a vehicle such as a hydraulic excavator.

b) Description of the Related Art

Figure 11:
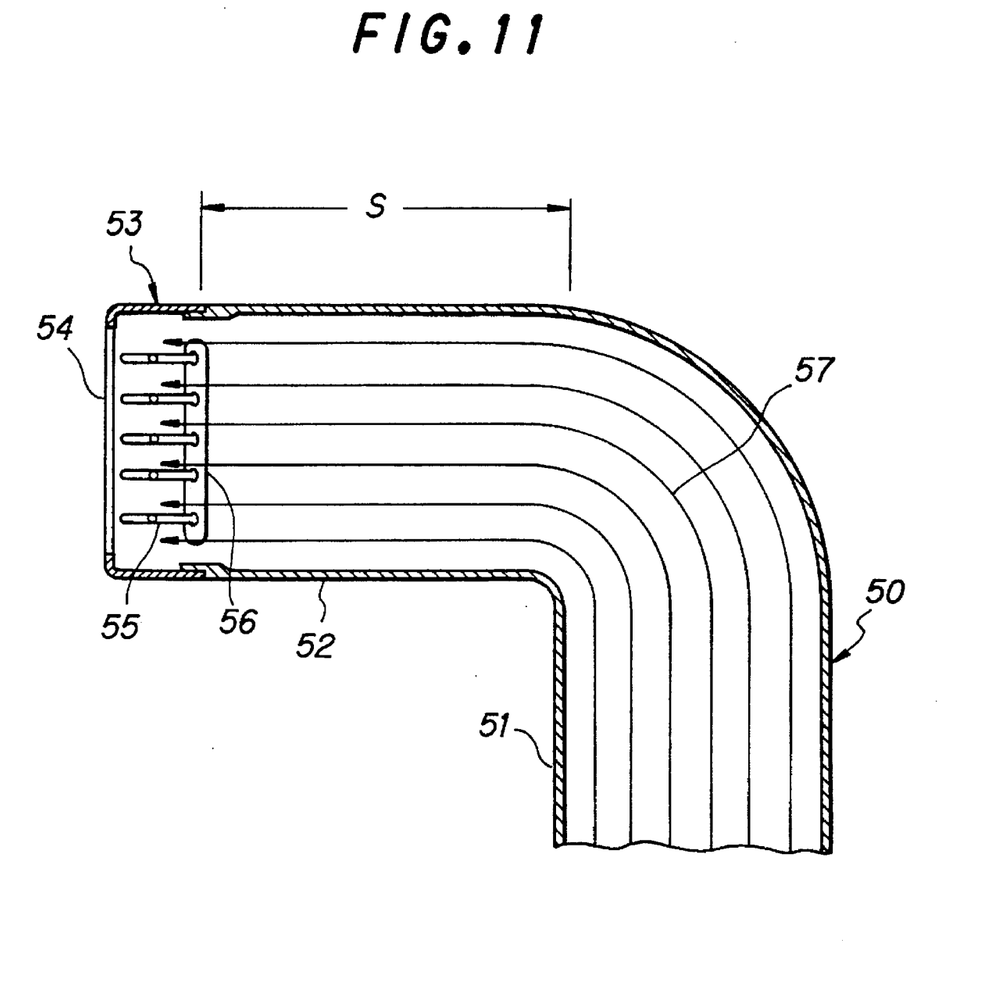
FIG. 11 is a fragmentary longitudinal cross-sectional view of a conventional air conditioner duct.

FIG. 11 is a fragmentary longitudinal cross-sectional view showing a conventional air conditioner duct suitable for connection with an air conditioner arranged in a cab of a heavy machinery. The air conditioner duct according to the prior art illustrated in FIG. 11 can be arranged, for example, in a cab of a hydraulic excavator. The air conditioner duct, which is designated at numeral 50 in FIG. 11, is fixed on an unillustrated air conditioner for a cab (not shown). The air conditioner is arranged, for example, in a lower part at the rear of an operator's seat. The duct 50 downwardly terminates in an unillustrated lower horizontal extension. This lower horizontal extension is arranged extending along a floor of the cab and is fixed at an end portion thereof to an air outlet of the air conditioner. The unillustrated lower horizontal extension is upwardly bent, for example, at the front of the unillustrated operator's seat so that a vertical extension 51 is formed as shown in FIG. 11. Further, at a predetermined height, for example, at a height corresponding to the face of the operator seated in the operator's seat, the vertical extension is bent toward the face of the operator seated in the operator's seat, thereby forming an upper horizontal extension 52 as depicted in FIG. 11. An air outlet member 53 is integrally formed at a free end of the upper horizontal extension 52.

As is illustrated in FIG. 11, the air outlet member 53 has a vertical face 54, which forms a release portion for air guided thereto through the duct 50 as indicated by arrows 57, and is internally provided with a plurality of turnable fins 55 disposed at vertical intervals and also with means for interlocking these fins 55 so that the fins 55 have the same inclination, namely, a connecting rod 56. The fins 55 are arranged with one end portions thereof facing the vertical face 55 and opposite end portions thereof turnably connected with the connecting rod 56. Further, manipulation of an unillustrated knob, which is arranged in front of the vertical face 54 and is connected to some of the fins 55, makes it possible to move the connecting rod 56 in the vertical direction. In addition, as is depicted in FIG. 11, the above-mentioned fins 55 have the same shape and dimensions, and are basically arranged in a horizontal direction which is in parallel with the upper horizontal extension 52 of the duct 50.

When the fins 55 are held in horizontal positions as shown in FIG. 11, air which has been treated in the unillustrated air conditioner is guided through the duct 50 and, as is indicated by the arrows 57, is allowed to flow through the upper horizontal extension 57 and then along upper and lower surfaces, in other words, guide surfaces of the fins 55. This air is thereafter released in a Substantially horizontal direction into the cab through an opening in the vertical face 54 so that at the same flow rate as that of the air passing through the spaces between the individual fins 55, the air is caused to flow toward the face of the operator seated in the unillustrated operator's seat. Manipulation of the unillustrated knob makes it possible to direct via the connecting rod 56 the individual fins 55 at substantially the same inclination relative to a horizontal plane so that the direction of the air from the vertical face 54 can be changed to an obliquely upper direction or an obliquely lower direction.

Since the air outlet member 53 is integrally fixed to the free end of the upper horizontal extension 52 of the duct 50 in the conventional art constructed as described above, the direction of air blown out from the air outlet member 53 can be changed only to such an extent as controllable by the fins 55. If the duct 50 is installed based on the average physique of operators who are expected to sit in the operator's seat, an operator whose physique is greater or smaller than the average physique may not feel comfortable because air may not be fed at a sufficient flow rate to the face or the like of the operator.

If the duct 50 is installed from the standpoint of feeding air to the fact of the operator in the operator's seat as mentioned above, it would then become impossible to feed defrosting or demisting air, for example, against a front window located on a side of a front wall of the cab and in front of the operator and against a side window located on a side of a side wall of the cab. For these defrosting and demisting purposes, an additional measure is needed such as arrangement of additional ducts.

If the duct 50 is installed so that air is blown, for example, toward the front window located on the side of the front wall of the cab from the standpoint of defrosting and demisting of the window, the side window located adjacent the front window is not fed with sufficient air, resulting in the potential problem that defrosting or demisting of the side window may not be performed effectively. In such a case, certain additional means is needed for the side window.

As is apparent from the foregoing, the conventional art is accompanied by the problem that an area in which air can be fed at a sufficient flow rate is narrow and an object to which air can be fed is hence limited to a rather specific one.

SUMMARY OF THE INVENTION

With the above-described situation of the conventional art in view, the present invention has as a primary object thereof the provision of an air conditioner which can broaden the area in which air can be fed at a sufficient flow rate.

To achieve the above object, the present invention provides an air conditioner duct suitable for connection with an air conditioner arranged in a cab. The air conditioner duct is provided with an air outlet member, which includes an air release portion for releasing air into the cab and plural fins for guiding air to the air release portion. The air outlet member comprises a turnable air outlet member shaped to enclose a duct portion, to which the turnable air outlet member is connected, and is turnable relative to the duct portion.

Further, the present invention provides an air conditioner duct suitable for connection with an air conditioner arranged in a cab. The air conditioner duct is provided with an air outlet member, which includes an air release portion for releasing air into the cab and plural fins for guiding air to the air release portion. The air outlet member comprises a turnable air outlet member which is turnable in a substantially horizontal plane.

The invention features the cab which has a front wall and a side wall and the turnable air outlet member is arranged between the front wall and the side wall.

The invention features the front wall and the side wall which are provided with a front window and a side window, and the turnable air outlet member is arranged between the front window and the side window.

The invention features the fins of the turnable air outlet member which have guide surfaces, respectively, the fins are arranged so that the guide surfaces face against an extending direction of the duct portion, end portions of each two adjacent fins among these fins, said end portions being located on a side opposite to the air release portion, are located with a stepping difference in depth therebetween so that the end portion of the fin located on a side farther from the duct portion is located on a deeper side than the end portion of the fin located on a side closer to the duct portion.

The invention features the air release portion which is formed in a tapered face, the plural fins have the same shape and dimensions, a portion of the turnable air outlet member is formed as a wall inhibiting release of air therethrough, the portion of the turnable air outlet member is located in continuation with the tapered face and adjacent an end portion of one of the plural fins, the one fin is located closest to the duct portion, and the end portion is located on a side of the air release portion.

The invention features the air release portion which is formed in a vertical face, the plural fins are different from each other in shape and dimensions, a portion of the turnable air outlet member is formed as a wall inhibiting release of air therethrough, the portion of the turnable air outlet member is located in continuation with the tapered face and adjacent an end portion of one of the plural fins, the one fin is located closest to the duct portion, and the end portion is located on a side of the air release portion.

The invention features the fins which are each provided at opposite side edge portions thereof with cut-off portions to permit flow of air therethrough.

According to the invention, there is provided the air output member turnable relative to the duct portion to which the air output member is connected. It is therefore possible to cause the air to flow out from the air outlet member in an area corresponding to its turnable range, thereby making it possible to broaden the area in which the air can be fed at a sufficient flow rate. Further, the turnable air outlet member is arranged between the front wall and the side wall. Especially, the turnable air outlet member is arranged between the front window and the side window. Accordingly, advance setting of the turnable range of the turnable air outlet member so that at least a position facing a front window and a position facing a side window can be included makes it possible, for example, to conduct defrosting or the like of the front window by causing the air to flow out through the turnable air outlet member directed toward the front window and then to perform defrosting or the like of the side window by turning the turnable air outlet member to the position facing the side window and causing the air to flow out at the same position. It is also possible to perform demisting of these windows.

According to the invention the fins of the turnable air outlet member are arranged so that the guide surfaces face against the extending direction of the duct portion to which the turnable air outlet member is connected, for example, extend at substantially right angles relative to the extending direction of the duct portion, and moreover, each two adjacent fins are located with the stepping difference in depth therebetween so that the end portion of the fin located on the side farther from the duct portion is located on the deeper side than the end portion of the fin located on the side closer to the duct portion. Accordingly, the air which has been guided through the duct can be distributed to flow passages defined at the stepping distance in depth between the individual fins so that the air is allowed to flow at substantially the same flow rate through the respective flow passages, and the guide surfaces of the individual fins serve to deflect the flowing direction of the air by 90°. It is therefore possible to directly connect the air outlet member to the vertical extension of the duct, namely, a duct portion in the form of a straight pipe and moreover to release the air into the cab at substantially the same flow rate between the individual fins of the air outlet member without disposing an upper horizontal extension, for example, between the vertical extension of the duct and the air outlet member to deflect the flowing direction of the air by 90°. Owing to the omission of such an upper horizontal extension, the duct can be produced shorter by a length corresponding to that of the upper horizontal extension. This makes it possible to reduce air resistance correspondingly and thus the capacity of the air conditioner accordingly. The manufacturing cost of the overall construction including the air conditioner can be reduced. Further, the possibility of a reduction in the length of the duct can give a substantial arrangement and design tolerance in the relatively small cab, thereby permitting its easy arrangement even in a cab of smaller dimensions.

Further, the portion of the turnable air outlet member, said portion being located adjacent the fin positioned on the side closest to the duct portion and being formed in continuation with the tapered face as the release portion, is formed as the wall inhibiting release of air therethrough. A portion of the air guided through the duct portion is therefore prevented from flowing toward the cab, so that the portion of the air is reversed in its flowing direction and then advances along the guide surface of the fin located on the side closest to the duct portion. The portion of the air then merges into the remaining portion of the air guided through the duct portion. The air can therefore be accurately distributed to the flow passages defined at the stepping distance in depth between the individual fins. Since the fins have the same shape and dimensions, the fins can be fabricated with ease.

According to the invention, the portion of the turnable air outlet member, said portion being located adjacent the fin positioned on the side closest to the duct portion and being formed in continuation with the vertical face as the release portion, is formed as the wall inhibiting release of air therethrough. A portion of the air guided through the duct portion is therefore prevented from flowing toward the cab, so that the portion of the air is reversed in its flowing direction and then advances along the guide surface of the fin located on the side closest to the duct portion. The portion of the air then merges into the remaining portion of the air guided through the duct portion. The air can therefore be accurately distributed to the flow passages defined at the stepping distance in depth between the individual fins.

According to the invention, the fins are each provided at the opposite side edge portions thereof with the cut-off portions to permit flow of the air therethrough. It is possible to avoid occurrence of air swirls at the opposite side edge portions of each fin and hence to smoothly release, through the air release portion, the air which has been guided through the duct.

DETAILED DESCRIPTION OF THE INVENTION AND PREFERRED EMBODIMENTS

Referring first to FIGS. 1 through 8, the air conditioner duct according to the first embodiment of the present invention will hereinafter be described.

Figure 1:
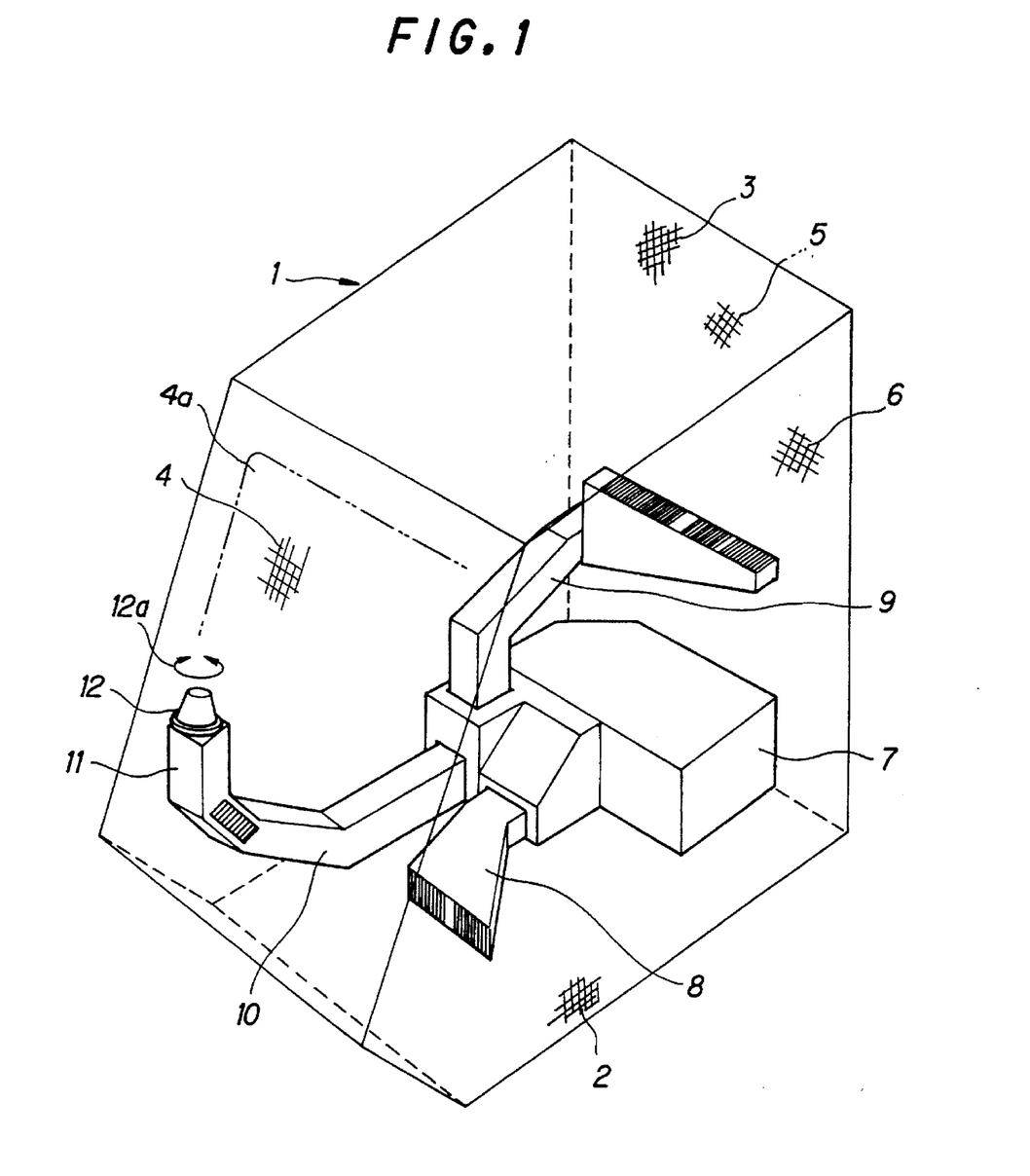
FIG. 1 is a perspective view showing a cab with an air conditioner duct according to a first embodiment of the present invention, in which to clearly show the air conditioner duct, a front window is partially depicted in phantom and illustration of both a side window and a rear window is omitted.
Figure 2:
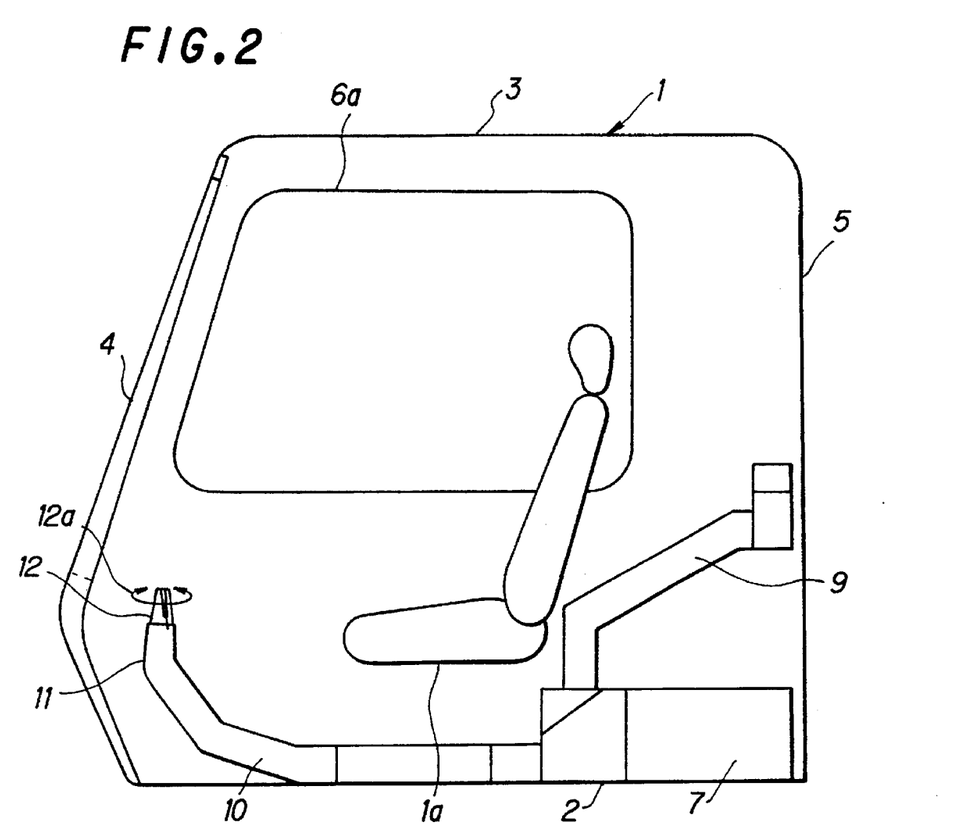
FIG. 2 is a side view of the cab shown in FIG. 1.
Figure 3:
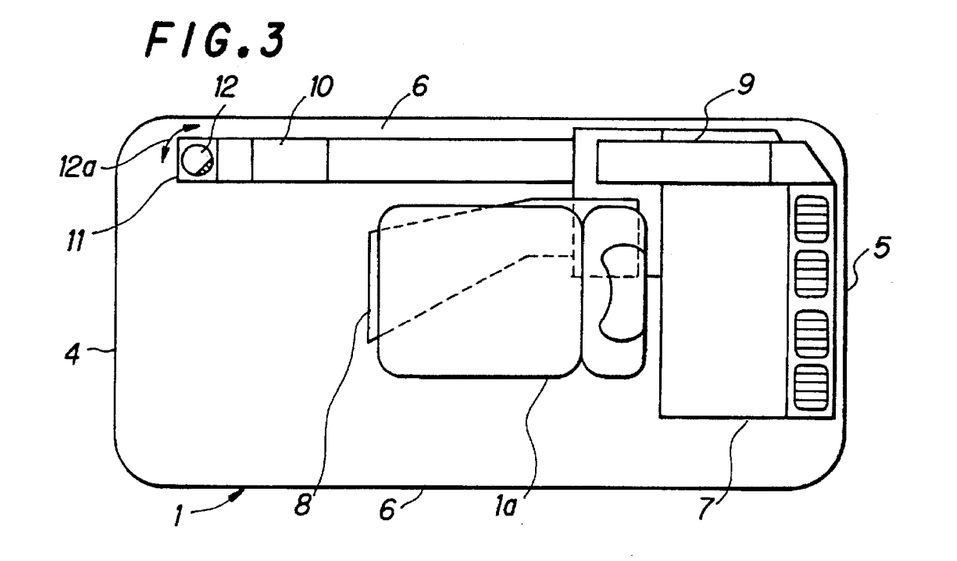
FIG. 3 is a top plan view of the cab depicted in FIG. 1.

FIGS. 1 through 3 schematically illustrate a cab mounted on a vehicle, for example, a cab 1 of a hydraulic excavator. This cab 1 is provided with a floor 2, a ceiling 3, a front wall 4 located in front of an operator's seat 1a, a rear wall 5 located in the rear of the operator's seat 1a, and two side walls 6. The front wall 4 is provided with a front window 4a, namely, a front glass pane and the rear wall 5 is also provided in an upper part thereof with a glass pane. One of the side walls 6 is provided with a door which can be opened or closed as desired, whereas the other side wall 6 is provided with a side window 6a. An air conditioner 7 is arranged on the floor 2 at a position located in a lower part at the rear of the operator's seat 1a. To an air outlet of the air conditioner 7, three ducts 8,9,10 are connected at one ends thereof. Of these ducts 8,9,10, the duct 10 constitutes the air conditioner duct according to the first embodiment.

This duct 10 is arranged extending along the floor 2 at a lower outboard position of the operator's seat 1a, and has three bent portions. A vertical extension 11 forming a free end portion is positioned, for example, in the vicinity of the front wall 4 at a front right part of the operator's seat 1a. The vertical extension 11 which is in the form of a straight pipe is provided at an upper end thereof with a turnable air outlet member 12. This air outlet member 12 is mounted on the vertical extension 11 turnably in a horizontal plane as indicated by arrow 12a.

Figure 4:
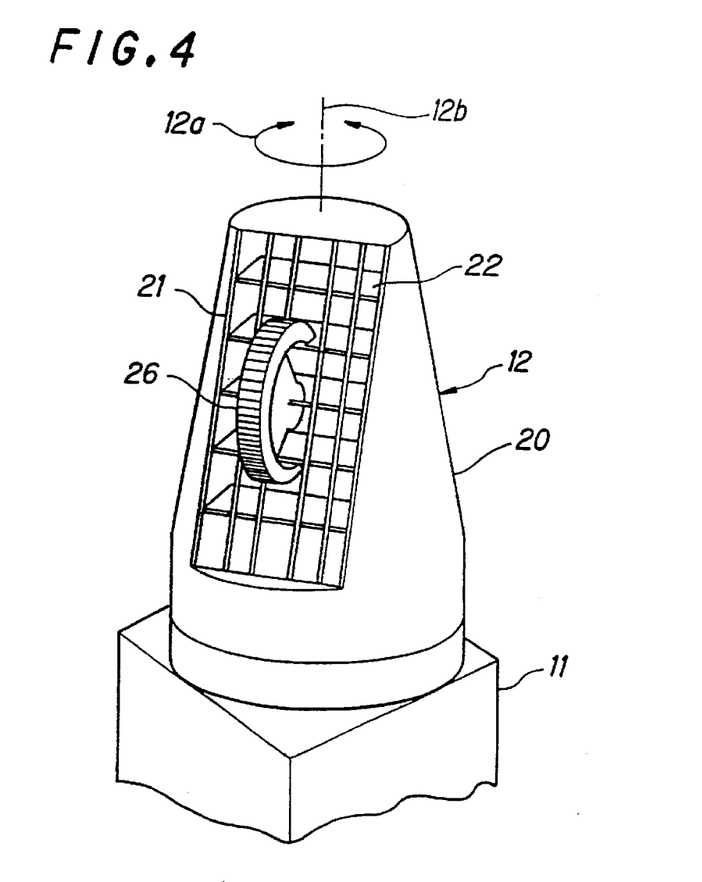
FIG. 4 is a perspective view of an air outlet member in the air conditioner duct according to the first embodiment.
Figure 5:
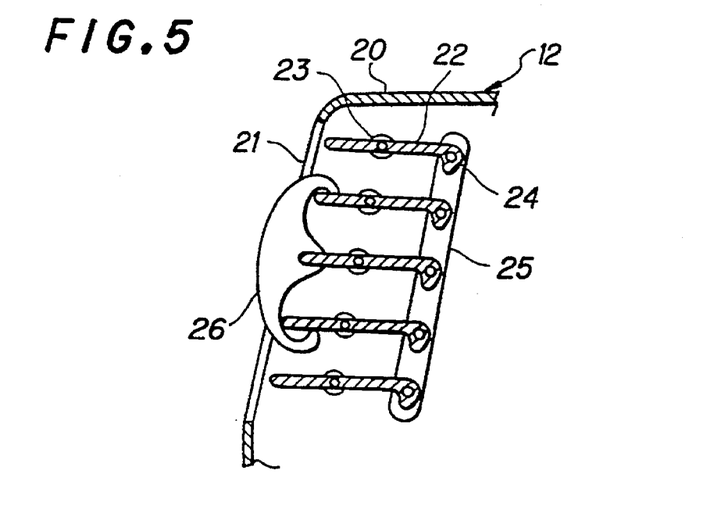
FIG. 5 is a fragmentary longitudinal cross-sectional view of the air outlet member illustrated in FIG. 4.

The air outlet member 12 is provided, as shown in FIGS. 4 and 5, with a main body 20 forming an outer shell and having an upwardly tapered shape, an air release portion formed in the main body and comprising a tapered face 21 including an opening, fins 22 arranged at plural stages turnably about respective shafts 23 within the main body 20 and having guide surfaces for air on upper and lower sides thereof, a connecting rod 25 with opposite end portions of these fins 22 connected thereto for relative turning motion, said connecting rod being adapted to cause the fins 22 to turn, and a knob 26 arranged in the tapered face 21 and connected, for example, to three fins 22 so that, when manipulated in a vertical direction, the knob causes the connecting rod 25 to move in the vertical direction via the above-mentioned three fins 22. The above-described knob 26 and connecting rod 25 constitute interlocking means so that these fins 22 are turned in a mutually-associated manner to position all the fins 22 at the same inclination relative to a horizontal plane.

Figure 6:
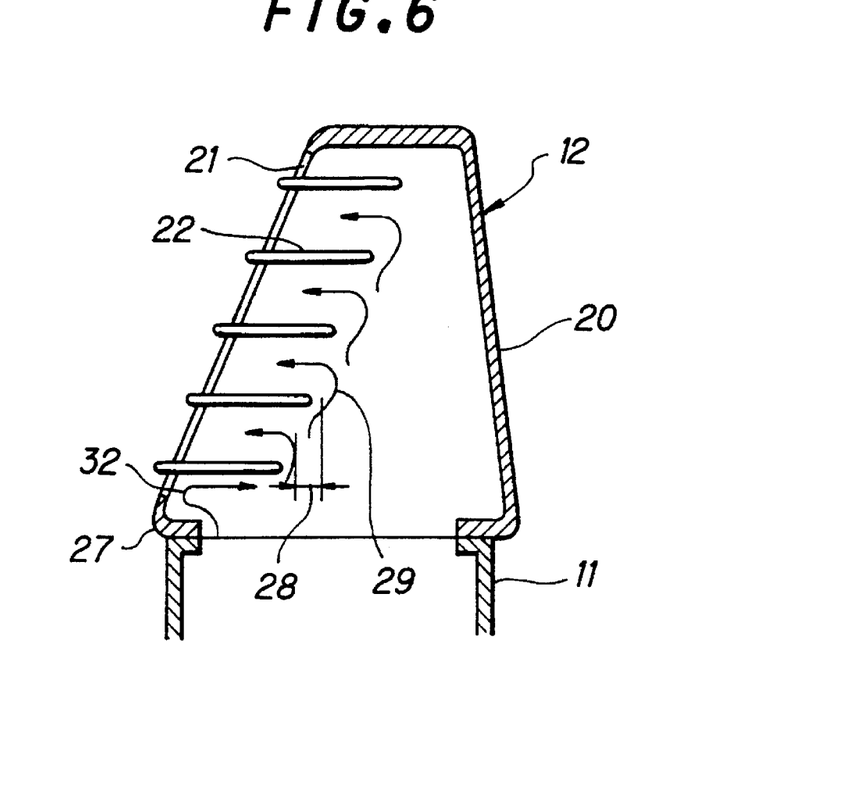
FIG. 6 is a simplified longitudinal cross-sectional view of the air outlet member shown in FIG. 4, illustrating the manner of arrangement of fins and flows of air available owing to the manner of arrangement.
Figure 7:
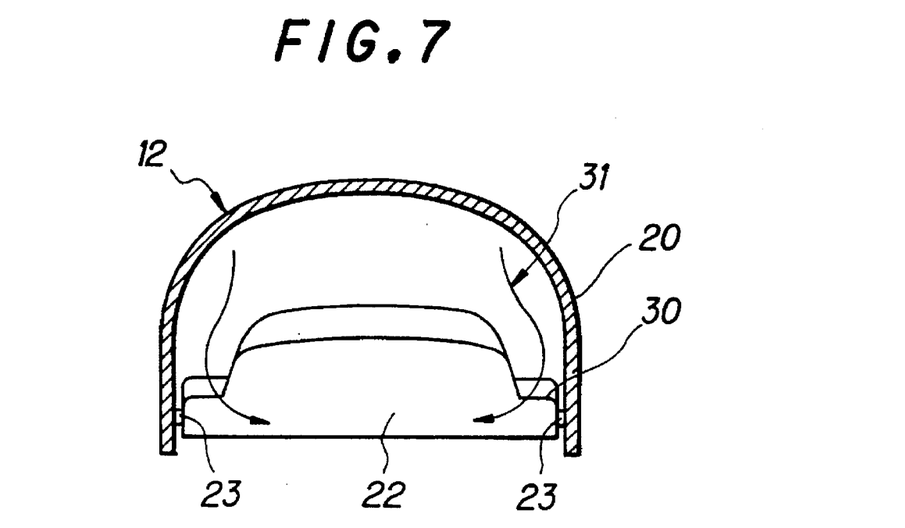
FIG. 7 is a fragmentary transverse cross-sectional view of the air outlet member depicted in FIG. 4.

The above-mentioned fins 22 are arranged, for example, at substantially right angles relative to the extending direction of the vertical extension 11 of the duct 10 so that, as shown in FIG. 6, their respective guide surfaces face against the extending direction of the vertical extension 11. Further, these fins 22 are arranged so that one ends thereof face the tapered face 21 forming the release portion and the opposite ends are disposed stepwise. Namely, each two adjacent fins 22 are located with a stepping difference 28 in depth therebetween so that the opposite end portion of the fin 22 located on the side farther from the vertical extension 11 of the duct 10 is located on a deeper side than the opposite end portion of the fin 22 located on a side closer to the vertical extension 11. Stepping differences 28 between the respective adjacent fins 22 are set at the same dimension. Further, as is illustrated in FIG. 7, the fins 22 are each provided at opposite side edge portions thereof with cut-off portions 30 to permit flow of air therethrough. As will be described subsequently herein with reference to FIG. 8, the individual fins 22 are formed with the same shape and dimensions, including a length t1. Further, intervals between the adjacent fins 22 are set at the same dimension t2.

Further, a portion of the main body 20, which portion is located in continuation with the tapered face 21 and adjacent the above-mentioned one end of the fin 22 in the lowest stage closest to the vertical extension 11 of the duct 10, is formed as a wall 27 inhibiting release of the air guided through the vertical extension 11.

The above-mentioned air outlet member 12 is turnable about an axis 12b shown in FIG. 4 in a range which includes a position where the tapered face 21 faces the front wall 4 shown in FIGS. 1 and 2, a position where the tapered face 21 faces the face and the like of the operator seated in the operator's seat 1a and a position where the tapered face 21 faces the side window 6a in the side wall 6 shown in FIG. 2.

Assume, for example, that the fins are individually maintained in their horizontal positions as shown in FIGS. 5 and 6 in the first embodiment constructed as described above. When the air conditioner 7 depicted in FIG. 1 is driven, air treated in the air conditioner 7 is guided to the ducts 8,9,10. The air guided to the duct 10 out of these ducts is guided into the vertical extension 11. The air which has been guided into the vertical extension 11 then flows into the air outlet member 12 as illustrated in FIG. 6. As indicated by arrow 32, flow of a portion of the air is limited and reversed by the wall 27 and is then guided by the guide surface, i.e., the lower side of the fin 22 in the lowest stage, whereby the portion of the air merges in the remaining portion of the air flowed into the air outlet member 12 and flows upwardly. At this time, owing to the respective stepping differences 28 formed between the adjacent fines 22, the above-mentioned merged air is distributed and fed into the flow passages formed between the individual fins 22. Because the individual fins 22 are arranged at substantially right angles relative to the extending direction of the vertical extension 11 of the duct 10, the flowing direction of the air is deflected by 90° relative to the flowing direction of the air passing through the vertical extension 11. Further, portions of the air around the opposite side edges of each fin 22 pass through the cut-off portions 30 of the fin 22 as depicted by arrows 31 in FIG. 7. The air is therefore prevented from developing swirls in the vicinity of the opposite side edges of each fin 22, thereby making it possible to create smoother flows of the air.

The air, which has been guided into the flow passage formed between each two fins 22 as described above, is released in a substantially horizontal direction into the cab 1 from an opening of the tapered face 21, so that the air is fed with reduced differences in flow rate in the vertical direction.

By moving the knob 26 upwardly or downwardly as desired, the connecting rod 25 is moved upwardly or downwardly via the three fins 22. As a result, the individual fins 22 are tilted to a similar extent relative to a horizontal plane so that the direction of the air to be released through the opening of the tapered face 21 can be adjusted to an obliquely upper direction or an obliquely lower direction.

By turning the air outlet member 12 so that the air outlet member 12 faces the face and the like of the operator seated in the operator's seat 1a, cool air, for example, can be fed to the face and the like of the operator. By turning the air outlet member 12 so that the air outlet member 12 faces the front wall 4 of the cabin 1, defrosting warm air or demisting wind can be fed to the front window 4a arranged in the front wall 4. Further, by turning the air outlet member 12 so that the air outlet member 12 faces the side wall 6 located on the right side of the cab 1 as viewed in FIG. 3, defrosting warm air or demisting wind can be fed to the side window 6a.

Figure 8:
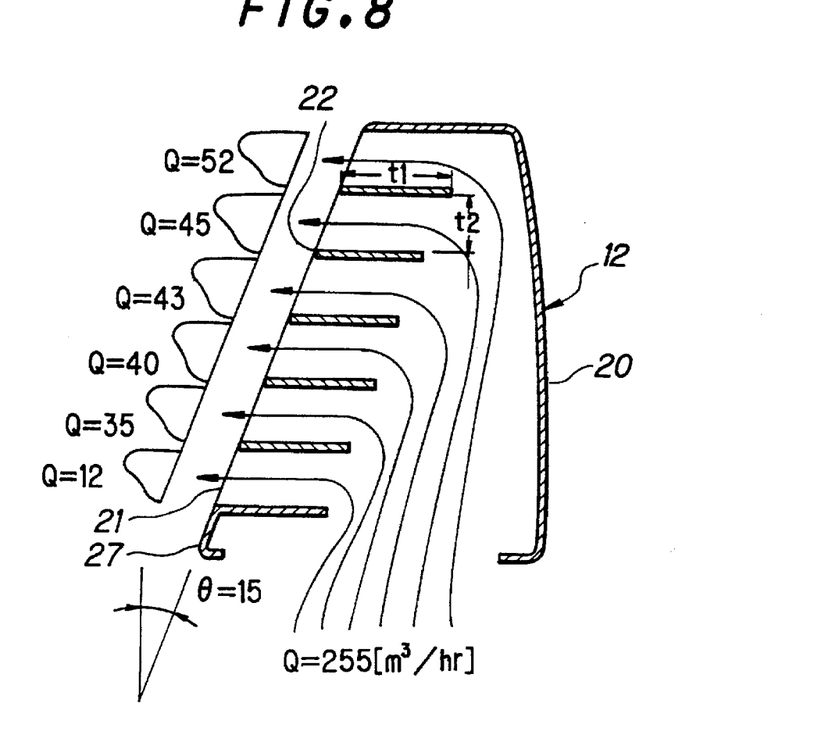
FIG. 8 is a simplified longitudinal cross-sectional view showing an air flow rate characteristic available from the first embodiment.

FIG. 8 illustrates one example of a flow rate characteristic available from the above-mentioned first embodiment. When the angle of the tapered face 21 was set to have the tapered face inclined at 15° relative to a vertical plane and air was fed at a flow rate Q of 255 m$^3$/hr, flow rates of 35 m$^3$/hr, 40 m$^3$/hr, 43 m$^3$/hr, 45 m$^3$/hr and 52 m$^3$/hr were obtained as the stage of the flow passage became higher, although the flow rate through the flow passage above the lowest fin 22 was 12 m$^3$/hr, namely, relatively small. It was hence possible to release the air at substantially the same flow rate through the flow passages between the individual fins 22.

According to the first embodiment constructed as described above, the stepping differences 28 are formed between the respective fins 22 as mentioned above. The air guided through the duct 10 can therefore be distributed to the flow passages formed between the individual fins 22 by way of the above-described stepping differences 28 so that substantially the same flow rate can be obtained through the individual flow passages. Further, the guide surfaces of the individual fins 22 serve to deflect the flowing direction of the air by 90°. Without arrangement of an upper horizontal extension, for example, between the vertical extension 11 of the duct 10 and the air outlet member 12 for the deflection of the flowing direction of the air by 90°, it is therefore possible to directly connect the air outlet member 12 to the vertical extension 11 of the duct 10, namely, to a duct portion in the form of a straight pipe and also to release the air into the cabin 1 at substantially the same flow rate between the individual fins 22 of the air outlet member 12. The duct 10 can therefore be produced shorter by a length corresponding to that of the upper horizontal extension. This makes it possible to reduce air resistance correspondingly and thus the capacity of the air conditioner accordingly. The manufacturing cost of the overall construction including the air conditioner 7 can be reduced. Further, the possibility of a reduction in the length of the duct 10 can give the duct 10 a substantial arrangement and design tolerance in the relatively small cab, thereby permitting its easy arrangement even in a cab of smaller dimensions.

In the first embodiment described above, the wall 27 is formed in continuation with the tapered face 21 of the air outlet member 12 so that flow of a portion of the air guided through the duct 10 is reversed by the wall 27 and is guided along the guide surface forming the lower side of the fin 22 in the lowest stage. The air which is to be released into the cab 1 can therefore be accurately distributed in its entirety by the respective stepping differences 28. As the fins 22 have the same shape and dimensions, the fins 22 can be easily fabricated so that the fabrication cost of the fins 22 can be reduced.

As the fins 22 are provided at the opposite side edges thereof with the cut-off portions 30 permitting flow of air therethrough in the above-described first embodiment, it is possible to avoid occurrence of air swirls at the opposite side edges of the fins 22 and hence to smoothly release the air, which has been guided through the duct 10, through the tapered face 21 forming the release portion. This can also reduce the air resistance.

According to the first embodiment, it is also possible to give preferred cool feeling to the operator by feeding cool air with the air outlet member 12 positioned opposite the operator as described above. When the air hardly flows against the face and the like of the operator because the physique of the operator is greater or smaller than the average, the problem can be overcome by slightly turning and adjusting the air outlet member 12. It is also possible to achieve removal of frost deposited on the front window 4a in the front wall 4 or the side window 6a in the side wall 6 by causing warm air to flow out with the air outlet member 12 facing the front window 4a or the side window 6a. It is also possible to achieve demisting of the front window 4a or the side window 6a by causing air to flow out with the air outlet member 12 facing the front window 4a in the front wall 4 or the side window 6a in the side wall 6. As is apparent, the first embodiment can broaden the area, in which air can be fed at a sufficient flow rate, by turning the air outlet member 12. It is hence possible to feed air to a greater number of objects and to achieve multiple functions.

Figure 9:
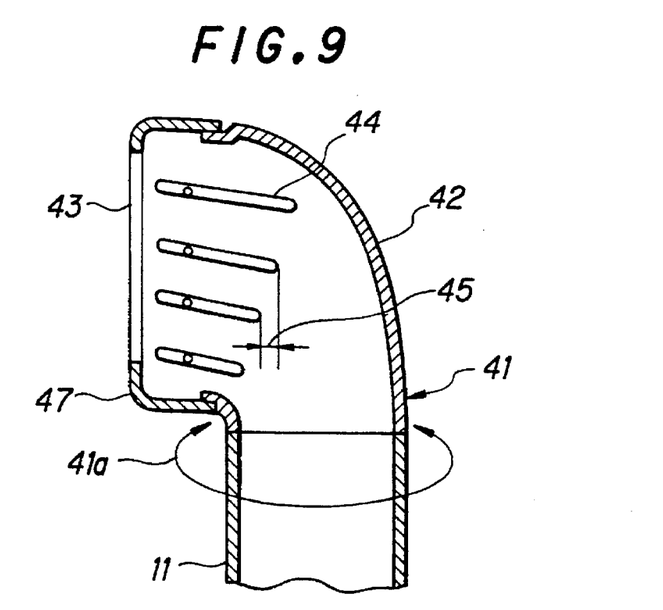
FIG. 9 is a fragmentary longitudinal cross-sectional view of an air conditioner duct according to a second embodiment of the present invention.

With reference to FIG. 9, the air conditioner duct according to the second embodiment of the present invention as defined in claims 2, 3, 4, 6, 7, 8, 9 and 10 will next be described.

Designated at numeral 11 in FIG. 9 is a vertical extension similar to the vertical extension 11 of the duct 10. The second embodiment is different from the above-described first embodiment only in the shape of a turnable air outlet member 41 which is attached to the upper end of the vertical extension 11. In the second embodiment, the air outlet member 41 is also turnable over a predetermined range in a horizontal plane as indicated by arrow 41a in FIG. 9.

In the air outlet member 41 shown in FIG. 9, an opening in a main body 42, that is, a release portion through which air is released is formed in a vertical face 43. Among fins 44 arranged in plural stages inside the main body 42, the length of the fin 44 located at a lowest position (i.e., a dimension corresponding to the above-described dimension t1 in FIG. 8) is set at a minimum dimension, and the fins 44 located above the lowest fin 44 are set to have a longer length as their locations become higher.

The remaining construction is similar to that of the first embodiment. For example, the fins 44 are arranged so that they extend at substantially right angles relative to the extending direction of the vertical extension 11. Further, these fins 44 are arranged with one ends thereof facing the vertical face 43 forming the release portion and opposite ends thereof being disposed in the form of stairs. Each two adjacent fins 44 are located with a stepping difference 45 in depth therebetween so that the opposite end portion of the fin 44 located on a side farther from the vertical extension 11 is located on a deeper side than the opposite end portion of the fin 44 located on a side closer to the vertical extension 11. Stepping differences 28 between the respective adjacent fins 44 are set at the same dimension. Further, a portion of the main body 42, which portion is located in continuation with the vertical face 43 and adjacent the fin 44 in the lowest stage closest to the vertical extension 11, is formed as a wall 47 inhibiting release of the air guided through the vertical extension 11.

Although not illustrated in the drawing, the fins 22 are each provided at opposite side edge portions thereof with cut-off portions to permit flow of air therethrough. Similarly, a knob and a connecting rod, which make up interlocking means, are also arranged although they are not shown either. The remaining features are similar to the corresponding ones in the first embodiment, and the duct including the vertical extension 11 is connected to an air outlet of an air conditioner arranged, for example, in a cab of a hydraulic excavator.

In the second embodiment constructed as described above, it is possible, as in the first embodiment, to directly connect the air outlet member 41 to the vertical extension 11 of the duct, namely, to a duct portion in the form of a straight pipe and also to release air into the cab at substantially the same flow rate through flow passages between the individual fins 44 of the air outlet member 41 owing to the provision of the stepping differences 45, whereby the length of the duct including the vertical extension 11 can be shortened. This makes it possible to reduce air resistance correspondingly and thus the capacity of the air conditioner accordingly. The manufacturing cost of the overall construction including the air conditioner can be reduced. Further, like the first embodiment, the second embodiment has brought about an arrangement and design tolerance in the relatively small cab, thereby permitting easy arrangement even in a cab of smaller dimensions. As in the first embodiment, the wall is formed in continuation with the vertical face 43 of the air outlet member 41 so that flow of a portion of the air guided through the duct is reversed by the wall and is guided along the guide surface forming the lower side of the fin 44 in the lowest stage. The air which is to be released into the cab can therefore be accurately distributed in its entirety by the respective stepping differences 45.

Further, the air outlet member 41 is turnable in the horizontal plane as indicated by arrow 41a so that the air outlet member can be used to feed cool air to the operator, to feed warm air for the defogging of the front window 4a and side window 6a and also to feed air for demisting. Like the first embodiment, the second embodiment can broaden the area in which air can be fed at a sufficient flow rate, and can feed air to a greater number of objects, thereby achieving multiple functions.

In the above-described embodiments, the hydraulic excavator was referred to as one example of vehicles on which the air conditioner ducts can be arranged. It is however to be noted that application of the present invention is not limited to such hydraulic excavators and that the air conditioner ducts according to the above embodiments can be applied to other cab-equipped construction machines and the like.

Further, the air outlet member 12 was arranged in the vicinity of the front wall 4 of the cab 1 in the above-described first embodiment. This invention is however not limited to this arrangement. The air outlet member 12 can be arranged in the vicinity of the rear wall 5 or desired one of the side wall 6.

In the above-described embodiments, each fin 22 or 44 is provided at the opposite side edge portions thereof with the cut-off portions 30 as shown in FIG. 7. Instead of providing the cut-off portions 30 as described above, it is also possible to form each fin 22, for example, in the shape of a semicircular plate so that gaps can be formed between an inner wall of the main body 20 or 42 and the opposite side edge portions of the semicircular fin to facilitate flow of air.

In the above-described embodiments, it is also possible to design the air conditioner duct 10 so that its intermediate portion is variable in length. For example, the vertical extension 11 can be designed to permit its arrangement in a vertically extendible/contractible manner. These modifications can further broaden the area in which air can be fed at a sufficient flow rate.

Figure 10:
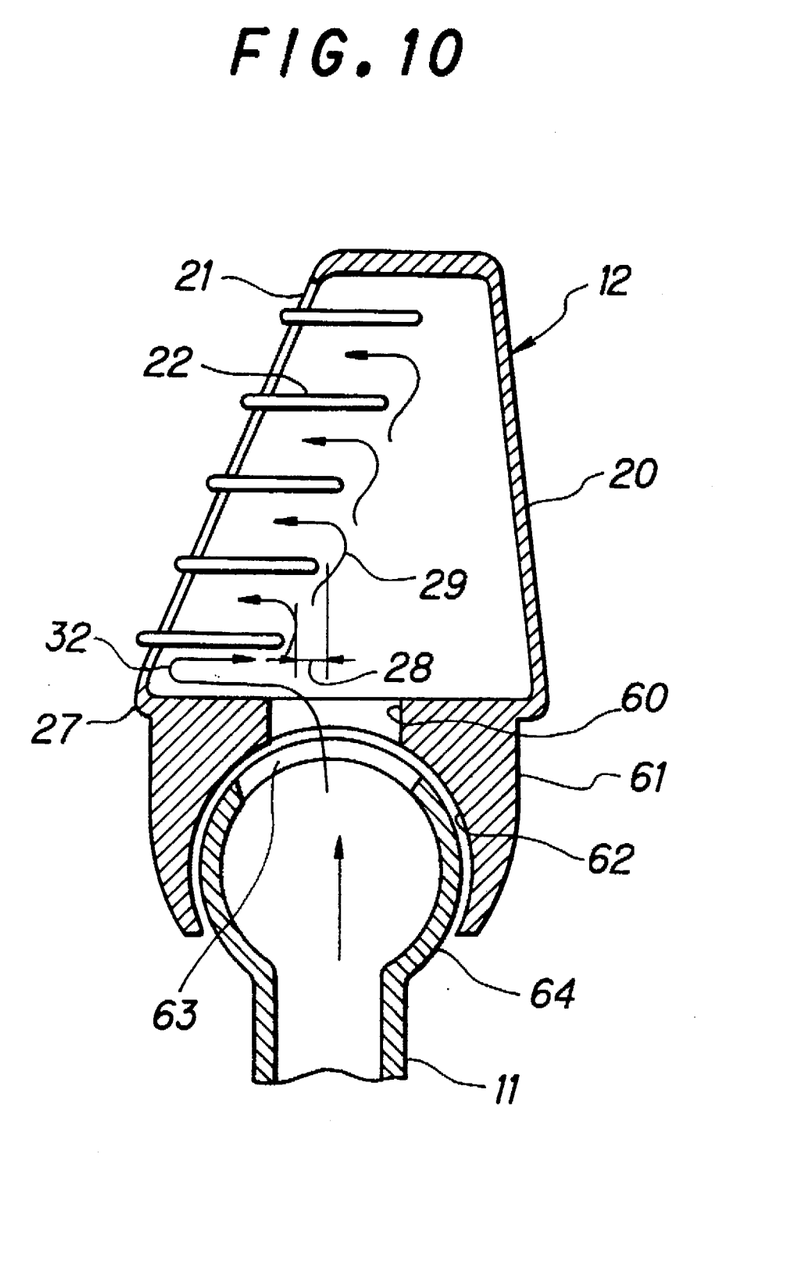
FIG. 10 is a fragmentary longitudinal cross-sectional view of an air conditioner duct according to a third embodiment of the present invention.

With reference to FIG. 10, the air conditioner duct according to the third embodiment of the present invention as described in claim 1 will next be described.

In the third embodiment, a main body 20 of an air outlet member 12 is provided at a lower part thereof with an extended portion 61 in which a through-hole 60 is defined. Further, a spherical recess 62 is also formed in the extended portion 61. An end portion of a vertical extension 11 of a duct to which the air outlet member 12 is connected is formed into a spherical bulge 64 which communicates with the through-hole 60 via a through-opening 63. The spherical bulge 64 is received slidably relative to and in the spherical recess 62 of the air outlet member 12. In other words, the air outlet member 12 encloses the end portion of the vertical extension 11 of the duct 10 and is three-dimensionally slidable relative to the end portion. Moreover, at a position where sliding of the air outlet member 12 is stopped, the air outlet member 12 is supported while maintaining its stationary spatial orientation achieved at the time of the stop of its sliding. The remaining construction is similar, for example, to that of the above-described first embodiment.

The third embodiment constructed as described above can bring about similar advantageous effects to the above-described first embodiment. In particular, owing to the three-dimensional turnability of the air outlet member 12, the area in which air can be fed at a sufficient flow rate can be broadened further compared with the first embodiment.

The connecting structure for the air outlet member 12 in the third embodiment, that is, the combination of the spherical recess 62 and the spherical bulge 64 can be applied to the above-described second embodiment shown in FIG. 9 so that the air outlet member 41 in the second embodiment can be three-dimensionally turned relative to the proximal end portion of the duct 11.

What is claimed is:

1. An air outlet member comprising an air release portion and a plurality of fins configured to guide air to said air release portion, said air outlet member configured to be connected to a duct portion which extends in an extending direction, wherein said fins of said air outlet member have guide surfaces, respectively; said fins are arranged so that said guide surfaces generally face said extending direction of said duct portion; each two adjacent fins have end portions located on a side opposite to said air release portion, and said end portions are arranged with a stepping difference in depth therebetween so that said end portion of said fin located farther from said duct portion is located on a deeper side than said end portion of said fin located closer to said duct portion.

2. An air outlet member according to claim 1, wherein said air release portion is formed in a tapered face; said plural fins have the same shape and dimensions; a portion of said air outlet member is formed as a wall inhibiting release of air therethrough, said portion of said air outlet member is located in continuation with said tapered face and adjacent another end portion of one of said plural fins, said one fin is located closest to said duct portion, and said another end portion is located on a side of said air release portion.

3. An air outlet member according to claim 1, wherein said air release portion is formed in a vertical face; said plural fins are different from each other in shape and dimensions; a portion of said air outlet member is formed as a wall inhibiting release of air therethrough, said portion of said air outlet member is located in continuation with said vertical face and adjacent another end portion of one of said plural fins, said one fin is located closest to said duct portion, and said another end portion is located on a side of said air release portion.

4. An air outlet member according to claim 1, wherein said fins are each provided at opposite side edge portions thereof with cut-off portions to permit flow of air therethrough.

5. An air outlet member according to claim 1, wherein said fins are provided with means for interlocking said fins so that said guide surfaces of said fins can be tilted at the same angle.

6. An air outlet member according to claim 1, wherein said air outlet member is arranged in a cab and is configured to be connected with an air conditioner.

7. An air outlet member according to claim 6, wherein said cab has a front wall and a side wall, and said air outlet member is arranged between said front wall and said side wall.

8. An air outlet member according to claim 6, wherein said front wall and said side wall are provided with a front window and a side window, and said air outlet member is arranged between said front window and said side window.

9. An air outlet member according to claim 6, wherein said cab is a cab of a hydraulic excavator.

10. An air outlet member according to claim 1, wherein said deeper side is a side located opposite to said air release portion.

11. An air outlet member according to claim 1, wherein said fins extend generally perpendicularly to said extending direction of said duct portion.

12. An air outlet member according to claim 1, wherein said air outlet member is turnable.

13. An air outlet member comprising an air release portion and a plurality of fins configured to guide air to said air release portion, said air outlet member configured to be connected to a duct portion which extends in an extending direction and said air outlet member being turnable in a substantially horizontal plane, wherein said fins of said air outlet member have guide surfaces, respectively; said fins are arranged so that said guide surfaces generally face said extending direction of said duct portion; each two adjacent fins have end portions located on a side opposite to said air release portion, and said end portions are arranged with a stepping difference in depth therebetween so that said end portion of said fin located farther from said duct portion is located on a deeper side than said end portion of said fin located closer to said duct portion.

14. An air outlet member according to claim 13, wherein said air release portion is formed in a tapered face; said plural fins have the same shape and dimensions; a portion of said air outlet member is formed as a wall inhibiting release of air therethrough, said portion of said air outlet member is located in continuation with said tapered face and adjacent another end portion of one of said plural fins, said one fin is located closest to said duct portion, and said another end portion is located on a side of said air release portion.

15. An air outlet member according to claim 13, wherein said air release portion is formed in a vertical face; said plural fins are different from each other in shape and dimensions; a portion of said air outlet member is formed as a wall inhibiting release of air therethrough, said portion of said air outlet member is located in continuation with said vertical face and adjacent another end portion of one of said plural fins, said one fin is located closest to said duct portion, and said another end portion is located on a side of said air release portion.

16. An air outlet member according to claim 13, wherein said fins are each provided at opposite side edge portions thereof with cut-off portions to permit flow of air therethrough.

17. An air outlet member according to claim 13, wherein said fins are provided with means for interlocking said fins so that said guide surfaces of said fins can be tilted at the same angle.

18. An air outlet member according to claim 13, wherein said deeper side is a side located opposite to said air release portion.

19. An air outlet member according to claim 13, wherein said fins extend generally perpendicularly to said extending direction of said duct portion.

* * * * *